(12) United States Patent
Linse et al.

(10) Patent No.: US 7,391,217 B2
(45) Date of Patent: Jun. 24, 2008

(54) METAL DETECTION METHODS AND APPARATUS WHEREIN A NUMERIC REPRESENTATION OF THE SENSE SIGNAL AND A NOISE CONTRIBUTION TO THE SENSE SIGNAL ARE PRODUCED

(75) Inventors: Michael H. Linse, Corvallis, OR (US); Phillip R. Hays, Corvallis, OR (US); Gary J. Oliver, Corvallis, OR (US); Thomas V. Scrivner, Sweet Home, OR (US); Jimmy Jack Jewell, Sweet Home, OR (US)

(73) Assignee: White's Electronics, Inc., Sweet Home, OR (US)

( * ) Notice: Subject to any disclaimer, the term of this patent is extended or adjusted under 35 U.S.C. 154(b) by 161 days.

(21) Appl. No.: 11/512,604

(22) Filed: Aug. 29, 2006

(65) Prior Publication Data

US 2008/0054905 A1    Mar. 6, 2008

(51) Int. Cl.
*G01V 3/08* (2006.01)
*G01V 3/10* (2006.01)
(52) U.S. Cl. ........................ 324/326; 324/225
(58) Field of Classification Search ......... 324/326–329, 324/225, 228, 236–243, 260
See application file for complete search history.

(56) References Cited

U.S. PATENT DOCUMENTS

| | | | | |
|---|---|---|---|---|
| 4,881,031 A * | 11/1989 | Pfisterer et al. | ............. | 324/233 |
| 5,523,690 A * | 6/1996 | Rowan | ............. | 324/329 |
| 5,596,277 A * | 1/1997 | Rowan | ............. | 324/329 |
| 5,929,634 A * | 7/1999 | Artinger | ............. | 324/233 |
| 6,529,007 B2 * | 3/2003 | Ott et al. | ............. | 324/327 |

* cited by examiner

*Primary Examiner*—Jay M Patidar
(74) *Attorney, Agent, or Firm*—Klarquist Sparkman, LLP

(57) ABSTRACT

Metal detectors include a sense coil coupled to an analog to digital converter that produces a numeric representation of an electrical signal associated with a conductive object situated in an active region of a sense coil. The numeric representation is processed to obtain a noise contribution associated with random noise, fixed pattern noise, and/or thermal drift. The noise is subtracted from the numeric representation to produce a numeric difference. The numeric difference includes contributions associated with conductive objects located in a sense volume defined by the sense coil. The numeric difference (or the numeric representation) can be digitally processed with, for example, a matched filter to enhance the conductive object contribution. The matched filter can be based on a measured sense coil speed or can be based on typical sense coil speeds.

25 Claims, 3 Drawing Sheets

METAL DETECTION METHODS AND APPARATUS WHEREIN A NUMERIC REPRESENTATION OF THE SENSE SIGNAL AND A NOISE CONTRIBUTION TO THE SENSE SIGNAL ARE PRODUCED

TECHNICAL FIELD

The disclosure pertains to metal detectors and detection methods.

BACKGROUND

Metal detectors have become increasingly important for recreational, industrial, and security applications. A typical metal detector includes a resonant circuit that is responsive to electrical signal losses in the resonant circuit associated with metal objects situated near the resonant circuit. As the resonant circuit and objects in a region of interest are moved with respect to each other, an electrical signal is produced that is associated with any conductive objects in the region of interest. Sensitive detection of these electrical signals is possible with compact circuit elements so that a typical metal detector can be made portable and readily configured for various applications.

Unfortunately, conventional metal detectors exhibit significant drawbacks that limit their applications. Electrical signals associated with the presence of metal objects tend to be very small, and are frequently mixed with substantial amounts of random or other noise. Thus, detection of small metal objects is difficult or impossible. In addition, some noise sources associated with the environment in which metal detectors operate can mask the presence of metal objects. For example, temperature changes can produce noise signals that are much larger than signals associated with metal detection, and false detection alarms can be produced as a result. As a result of these significant amounts of random noise and environmental noise, some objects of interest cannot be detected or are associated with impractically high false positive detection rates. Accordingly, improved metal detection methods and apparatus are needed.

SUMMARY

Apparatus for the detection of conductive objects comprise a sense coil defining a sensing volume. An analog to digital converter (ADC) is coupled to the sense coil and configured to receive a sense signal that includes a contribution associated with a conductive object situated in the sensing volume. The ADC produces a numeric representation of the sense signal. A signal processor is configured to receive the numeric representation of the sense signal and produce a numeric representation of a noise contribution to the sense signal. In some examples, the signal processor is configured to produce a processed numeric signal based on a difference between the numeric representation of the sense signal and the numeric representation of the noise contribution. In some examples, the signal processor is configured to produce the numeric representation of the noise contribution with a digital low pass filter. In other examples, the signal processor comprises a memory configured to store at least one filter coefficient and processes the difference based on the at least one stored filter coefficient. In still other examples, the numeric representation of the sense signal is processed based on the at least one filter coefficient and this processed signal is used to estimate the noise contribution. In further representative examples, the signal processor is configured to process the difference so as to produce an autocorrelation. In other representative examples, the filter coefficients are based on a contribution to a sense signal produced by relative motion of the sense coil and a conductive object.

In additional examples, detection systems comprise a motion sensor coupled to the signal processor and configured to produce an indication of a sense coil speed. The signal processor is configured to produce and store the filter coefficients based on the indication of the sense coil speed. In other examples, a relative motion of a sense coil and object in a sense volume can be estimated based on detecting motion of the objects. In other examples, a memory is coupled to the signal processor and configured to store a representation of thermal noise magnitude as a function of temperature, and the signal processor is configured to determine a thermal contribution based on the representation. In additional embodiments, an alarm is configured to indicate the presence of a conductive object in the sense volume, and the indication is based on a magnitude of the object contribution to the numeric representation of the sense signal.

Detection methods for detection of conductive objects comprise obtaining a detection signal from a sense coil, wherein the detection signal is associated with a presence of a conductive object in a sense volume. The detection signal is digitized to produce a numeric representation of the detection signal and the numeric representation of the detection signal is stored in a memory and processed to produce an estimated noise contribution to the numeric representation. A conductive object contribution to the numeric representation is estimated based on a difference between the numeric representation of the detection signal and the estimated noise contribution.

According to some examples, an estimated conductive object contribution is based on a temporal response associated with a relative speed of the sense coil and a conductive object in the sense volume. In particular examples, the methods further comprise obtaining an indication of the relative speed of the conductive object, and obtaining an estimated object contribution based on the indicated relative speed. In other examples, the numeric representation of the sense coil signal is processed based on the relative speed. In representative examples, the processing is matched filtering using filter coefficients determined in response to the indicated relative speed.

In some examples, method comprise comparing an estimated conductive object contribution to an alarm threshold, and producing an alarm based on the comparison. In representative examples, an alarm magnitude is based on the comparison. The alarm is typically at least one of an audible or visible alarm.

In other examples, a conductive object detection system comprises a first sense coil and a second sense coil. A sense coil selector is configured to select one or more of the first sense coil and the second sense coil so as to produce a sense signal. An analog to digital converter is configured to produce a numeric representation of the sense signal. A signal processor is configured to produce an indication associated with a conductive object in the sense volume based on a difference of the numeric representation of the sense signal and a low pass filtered numeric representation of the sense signal. In further examples, the first sense coil has a substantially larger sense volume than the second sense coil. In other examples, the sense coil selector is configured to select the first and second sense coils so as to produce a sense signal based on the combination. In additional examples, the sense coil selector is configured to select the first and second sense coils so as to define a first sense volume and second sense volume, wherein the first sense volume is less than the second sense volume.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" means electrically or electromagnetically coupled or linked and does not exclude the presence of intermediate elements between the coupled items.

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

The disclosure pertains to methods and apparatus for the detection of electrically conductive objects. In many applications, such objects are concealed by non-conductive objects. For example, airline passengers are customarily screened to locate any metal objects such as knives or other weapons that are not permitted on board commercial aircraft. Typically, systems and devices for such applications are referred to as "metal detectors" and for convenience, are referred to as metal detectors or metal detection systems herein. However, such systems are not limited to the detection of metallic objects but instead can locate and identify conductive objects of other types. Detection of a particular object can depend on the object size, shape, orientation, and the conductivity of the materials of which it is made.

Figure 1:
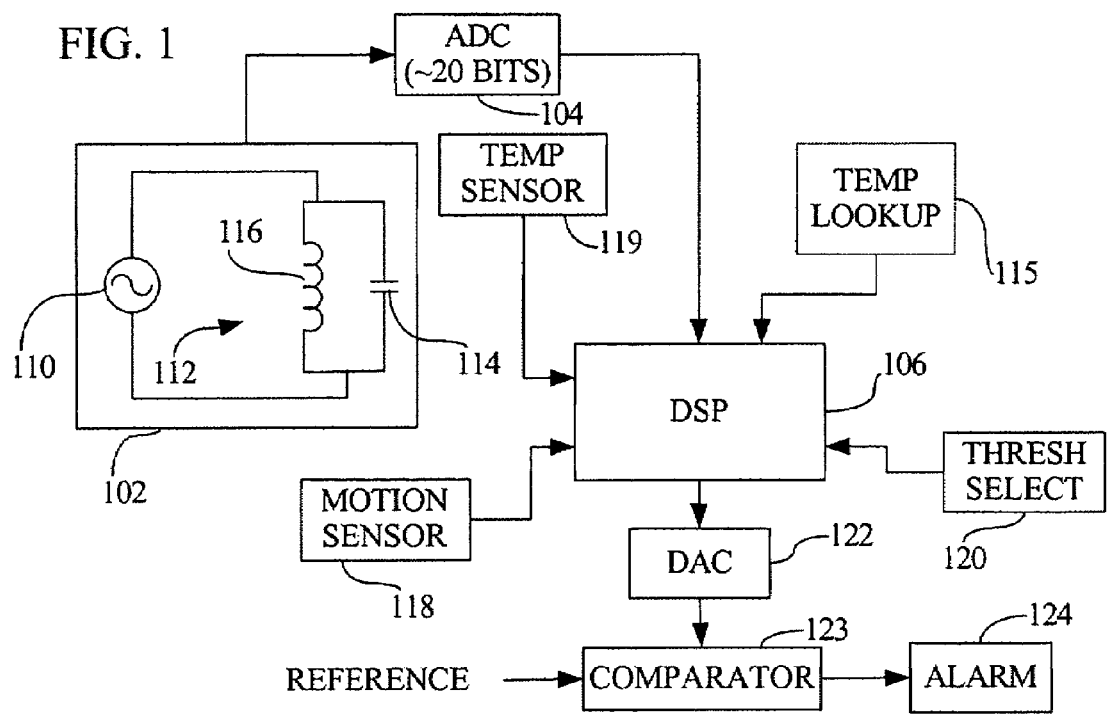
FIG. 1 is a block diagram illustrating a representative metal detector system.

FIG. 1 is a block diagram of portions of a representative metal detector system that includes a resonant circuit portion 102, an analog to digital (ADC) converter 104, and a digital signal processor 106. The resonant circuit portion 102 includes a signal generator 110 that is coupled to a tank circuit 112 that includes a capacitor 114 and a coil 116. In practice, the capacitor 114, the coil 116, and/or other components exhibit some resistance as well, but such resistances are not shown in FIG. 1. The coil 116 is typically a multi-turn coil, but a single turn can also be used. The signal generator 110 is generally configured to drive the tank circuit 112 at or near a tank circuit resonant frequency that is generally dependent on a product of the capacitance of the capacitor 114 and the inductance of the coil 116. One or more electrical characteristics of the tank circuit 112 is responsive to conductive objects situated at or near the coil 116. Such conductive objects tend to cause the resonant circuit to exhibit additional loss. In the presence of such loss, the signal generator is configured to provide power to compensate or partially compensate such loss, and this additional power supplied to the resonant circuit can be detected as an indication of a conductive object. In other examples, multiple coils can be provided, and the signal generator 112 can be configured to provide an appropriate electrical drive signal for different resonance frequencies of the multiple coils.

An electrical signal that varies in response to the presence of one or more conductive objects is DC coupled to the ADC 104, and a numeric representation of the electrical signal is produced. Such electrical signals are referred to herein as "sense coil signals." However, these sense coil signals can be signals obtained from sense coil drive circuitry that supplies a drive signal to one or more sense coils based on sense coil circuitry. For example, drive signals can be varied based on tank circuit resonant frequency, loss, quality factor ("Q"), resonance bandwidth, or other property, and such variations in drive signal can be associated with a sense coil signal. In some examples, a sense coil signal is obtained as a control signal or feedback signal used to maintain sense coil drive at a predetermined level. These and other signals are referred to herein as sense coil signals. In the example of FIG. 1, DC coupling is used but in other examples, AC coupling can be used to, for example, reject some low frequency signal portions.

In a typical example, the magnitude of the electrical signal can be as much as a few volts (or higher) while numeric values corresponding to electrical signal contributions of as little as 2 μV (or less) can be associated with detection of conductive objects. Accordingly, in representative examples, the ADC 104 is configured to provide 20-24 bits or more of resolution in the numeric representation. In other examples, higher or lower ADC resolutions could be used. Typically, an ADC resolutions is selected so that signal portions associated with conductive objects can be extracted from digitized signals. In some examples, the electrical signal from the oscillator circuit 102 can buffered, filtered, or otherwise processed prior to digitization. For example, the electrical signal can be amplified or attenuated to conform to an input range of the ADC 104. The electrical signal generally includes portions associated with a conductive object as well as random noise and deterministic noise. For convenience, contributions associated with the presence of a conductive object are referred to as "object" contributions and other signal portions are referred to as "noise." Digitized signals (i.e., numeric data) are also referred to for convenience as object numeric data, noise numeric data, or combined numeric data. Although signals or numeric data can be referred to as being associated with "object" or "noise" contributions, signals or numeric data typically include both object and noise contributions even after combined data is processed to eliminate or attenuate noise or data contributions.

The numeric representation is coupled to the DSP 106 by the ADC 104 and can be stored in a memory that is included in or separate from the DSP 106. The DSP 106 can be implemented as a microprocessor configured to receive and execute instructions provided from a storage medium such as, for example, a floppy disk, a CD or DVD, a non-volatile memory, or provided via a local area network, a wide area network, or the Internet. In some examples, the DSP 106 can be configured as a personal computer, a personal digital assistant, a workstation, a dedicated DSP chip or hybrid, or other digital processing apparatus or system. In a typical application in which a compact, low power metal detector is intended, a microprocessor can be convenient. A processed detection signal is coupled from the DSP 106 to a digital to analog converter 122.

While the DSP 106 can be configured to provide a variety of processing functions, one or more additional signal processing systems can be used that are configured for a particular processing task. In some examples, the ADC 104 and the DSP 106, and other detection functions can be provided by a single integrated circuit. Use of single DSP 106 can be convenient, especially for portable or handheld metal detection systems.

In some examples, the numeric metal detector data can be processed by the DSP 106 without additional signal or environmental inputs. However, in some examples, signal contributions associated with for example, temperature changes or background electrical noise, can be compensated or partially compensated by detecting temperature changes or background noise. As used herein, "noise" refers to signal contributions associated with random processes such as shot noise or Nyquist noise as well as signal contributions associated with deterministic processes such, for example, as background electrical fields, temperature changes, motion, and fixed pattern noise associated with, for example, detector power supplies. For example, as shown in FIG. 1, the DSP 106 is also coupled to a temperature sensor 119. The temperature sensor 119 can be situated to respond to temperatures in the resonant circuit such as at the oscillator, coil, or capacitor, or any components thereof that exhibit appreciable temperature sensitivity. Measured temperatures can be used to at least partially compensate signal changes associated with temperature changes. Typically, a memory 115 is provided with a lookup table that associates measured temperatures with temperature-based signal contributions so that these temperature-based signal contributions can be reduced or eliminated. In addition, at least some circuit components can be temperature controlled with, for example, one or more thermoelectric coolers to reduce noise associated with temperature changes. In some examples, one or more circuit portions can be cooled to reduce thermal noise as well.

While temperature or other parameters associated with signal noise can be detected so that noise contributions can be reduced, desired signal components can be preferentially selected by determining one or more features expected of signal portions associated with detection of a conductive object. For example, as shown in FIG. 1, a motion sensor 118 is secured to sense coil 116 or otherwise substantially fixed with respect to the sense coil 116. The motion sensor 118 communicates a motion signal to the DSP 106 so that conductive objects can be identified based on data characteristics associated with relative movement of the coils and the conductive object. For example, if the coil moves rapidly with respect to a conductive object, the associated detection signal should have a shorter duration than that produced using less rapid coil movement. Examples of this procedure are described below.

A threshold selector 120 can also be coupled to the DSP 106 so that a detection threshold can be established either under control of the DSP 106, or based on a user input. The threshold selector can be implemented as a software component that selects a numeric value for comparison with the numeric values of the detected signal. Alternatively, the threshold selector can include a user adjustable component such as a switch, a variable resistor, or other circuit or software component that provides a digital or analog threshold signal to the DSP 106. Alternatively, the processed numeric signal from the DSP 106 can be directed from the ADC 122 to a comparator 123, and a selected reference level coupled directly to the comparator 123.

Based on processing and analysis of the metal detector data, the DSP 106 is configured to couple an alarm signal to an alarm device 124 such as an audible alarm device (such as a speaker, headphone, or audio output connector) or a visual alarm device (such as a light emitting diode). Other types of alarms such as, for example, a tactile alarm (vibration), a voice alert, or other audible or visible alarms can be used. The alarm signal from the DSP 106 can be a single bit or multi-bit signal, or an analog signal. The DSP 106 can be configured to provide a relatively larger alarm signal magnitude for relatively larger conductive objects. In this manner, the alarm provided to the user can be approximately proportional to an amount by which the processed numeric data exceeds a threshold level so that a rough indication of object size is available to the user. Other indications can also be used such as differing tones, different light intensities or modulation rates, or numbers of activated light emitters, colors, or voice announcements.

Figure 2:
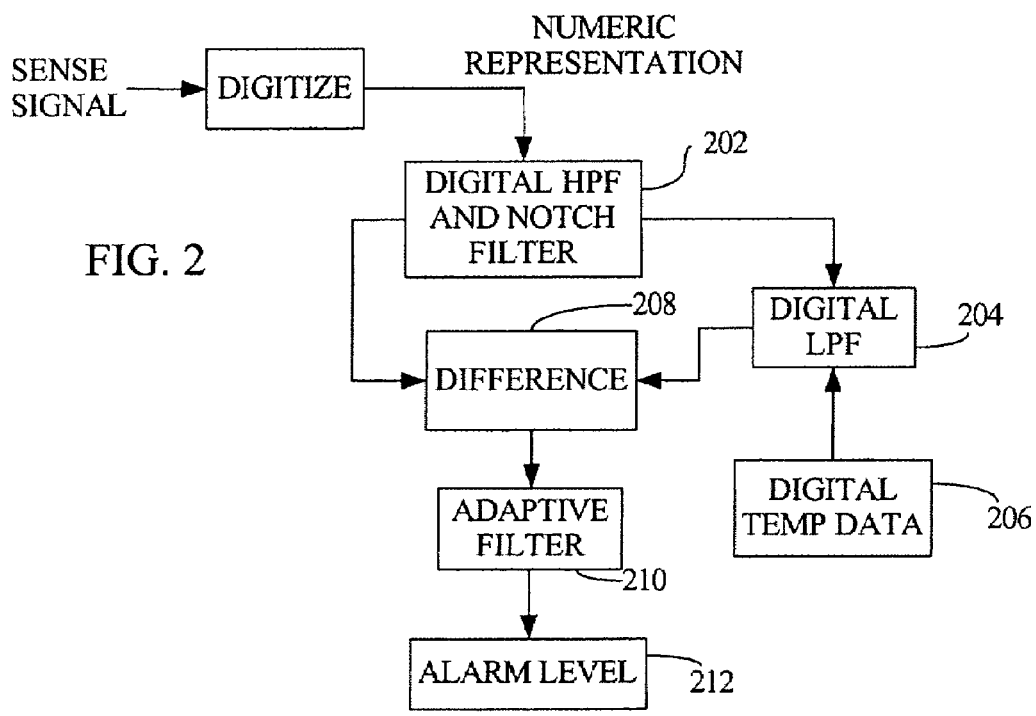
FIG. 2 illustrates a representative method for processing a sense signal obtained by a metal detector system.

A representative method of processing of the numeric detector data is illustrated in FIG. 2. The numeric data is digitally low pass and notch filtered in a step 202. The notch filter is typically configured to substantially attenuate 50 Hz and/or 60 Hz signal contributions that are generally associated with power line pickup. Notch filtering can be implemented as a numeric sinc function (i.e., $\sin(x)/x$) filter. The low pass filter is selected to substantially attenuate signal components at frequencies higher than those associated with detected conductive objects. The step 202 produces filtered numeric data which includes portions associated with conductive objects as well as other contributions (noise) that are substantially in the same frequency band as signal contributions associated with conductive object detection.

After the low pass filtering and notch filtering of step 202, the filtered numeric data includes in-band noise (deterministic and random) as well as contributions associated with detection of a conductive object. In a step 204, the filtered numeric data is processed by, for example, low pass filtering, to substantially attenuate signal contributions associated with the presence of conductive objects to produce numeric noise data. Because signal contributions associated with the presence of conductive objects typically have total durations of between about 0.01 sec and several seconds, a low pass filter can be selected to substantially attenuate signal contributions associated with conductive objects, so that noise only numeric data is produced. In a step 208, a difference between the filtered numeric data and the noise numeric data is produced. This difference data can be further processed by, for example, an adaptive filter in a step 210 and then used to output an alarm 212 depending on numeric data values.

The step 210 can be omitted, or such filtering can be applied in association with the step 202. Because the object signal (and associated object numeric data) depend on relative motion of an object and a sense coil, filtering in the step 210 can be based on this relative motion. For relatively rapid movements of the coil with respect to a conductive object, object signals/numeric data are associated with higher frequency components that for slower movements. Thus, based on an estimation of object/coil motion (such as provided by a motion sensor), an anticipated object signal temporal waveform (and corresponding numeric representation) can be estimated. In an example, the adaptive filter is a matched filter that is based on a rate of estimated coil/object motion. In some examples, relative sense coil/object motion is not sensed, and filtering is based on typical values that can be predetermined.

In a particular example, identification and extraction of an object signal is based on a cross-correlation of a measured object signal with a model object signal that can be an estimated, average, typical, or user-selectable model signal associated with conductive object detection. In other examples, the model object signal is based on estimated object/sense coil relative motion as determined by a motion sensor. In other examples, Wiener filters or moving average filters can be used.

In operation, the low pass filtering performed in the step 204 can require sufficient time that a detector user is aware of an appreciable delay upon initiation of a detection system. This delay can be reduced by implementing a low pass filter as a multi-stage finite impulse response filter so that approximations to the numeric noise can be obtained more quickly when a detection system is turned on. The initial noise data can be further processed, and after the detection system has been in use for several seconds, numeric noise data associated with the complete filter and not just an intermediate filter stage can be available.

As noted above, the object contribution to a sense coil signal is typically substantially smaller than noise contributions such as those associated with temperature variations. In conventional approaches, attempts are made to remove such large noise contributions prior to any other signal processing. In contrast, as described herein, numeric data is based on combined noise and object contributions, and noise contributions are then identified in the combined numeric representation.

A sense coil or coils can be selected based on the nature of the conductive objects to be detected. Coil dimensions similar to the dimensions of objects to be detected are generally preferable in order to obtain detection signals having superior signal to noise ratios. Small coils are disadvantageous in scanning large objects as a considerable time can be required to scan the metal detector coil over the entire object. In addition, scanning with a small coil can miss regions between scanned areas so that objects are undetected. FIGS. 3, 4A-4B, 5 illustrate coil configurations that provide both large and small coils and can be configured based on a size of an object to be detected.

Figure 3:
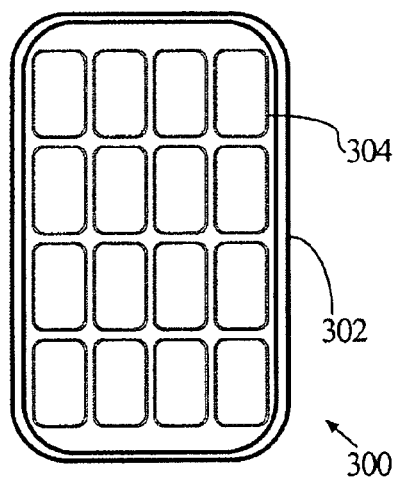
FIG. 3 illustrates a representative coil configuration that includes a primary sense coil and an array of secondary sense coils.
Figure 5:
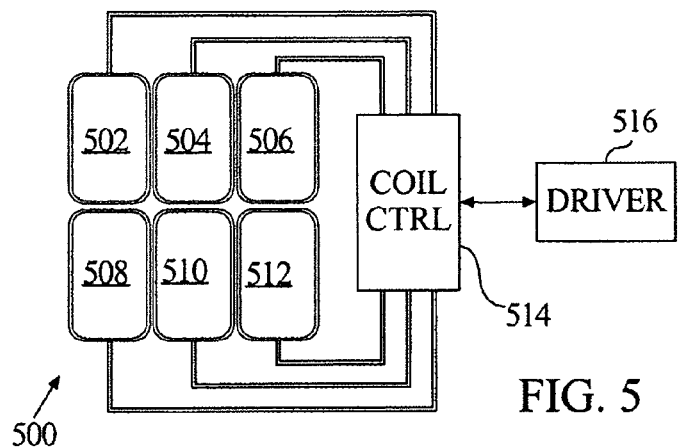
FIG. 5 illustrates a system for selecting current configurations for a sense coil system that includes a plurality of coils.
Figure 4A:
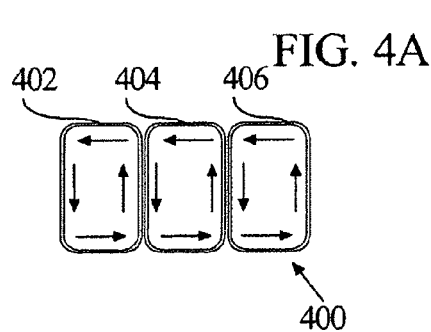
FIGS. 4A-4B illustrate representative current configurations in an array of sense coils.
Figure 4B:
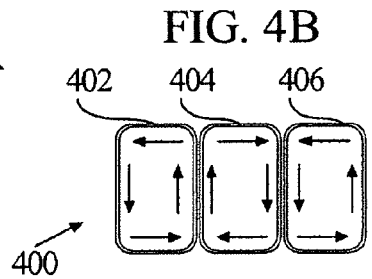

With reference to FIG. 3, a multi-coil assembly 300 includes a primary coil 302 and an array of secondary coils 304. As shown in FIG. 3, a 4 by 4 array of coils having a rectangular cross section is situated within a cross sectional area defined by the primary coil 302. This arrangement is merely a representative example, and more or fewer coils can be provided, and square, circular, elliptical, or other coil cross-sections can be provided. FIGS. 4A-4B illustrate an array of coils 402, 404, 406 that is configured to have different current phases. As shown in FIG. 4A, currents in adjacent vertical coil segments are substantially opposite, while in FIG. 4B, currents in adjacent vertical coils segments are substantially in the same direction. FIG. 5 illustrates an array of coils 502, 504, 506, 508, 510, 512 that is coupled to a coil controller 514. A coil driver 516 is coupled to the array of coils by the coil controller 514 which is configured to provide various coil current configurations, or to select one or more of the coils to be energized. An effective sense coil cross-section (and sensing volume) can be selected based on sense coil energization.

In a typical example, a metal detector including a sense coil assembly such as that of FIG. 3 is configured to selectively activate and respond to either a large or small sense coil. Because sense coils are typically configured as part of a resonant circuit, selection of a particular coil or coils can be associated with selection of a corresponding electrical drive signal characteristic, for example, a drive signal frequency. In some examples, one or more sense coils of different geometries and/or cross-sectional areas can be configured to provide a common inductance or otherwise configured to provide a common resonant frequency.

As shown above, one or more sense coils having different sense volumes can be used in a single detection system. (Sense volumes are typically associated with sense coil cross sectional area.) The coils can be configured to use the same energization signal (for example, the same drive frequency) and two or more coils can be coupled to provide different sense volumes based on relative current flows in the coils. In other examples, two or more coils are simultaneously activated so that, for example, both large and small sense volume coils can be simultaneously investigated.

Figure 6:
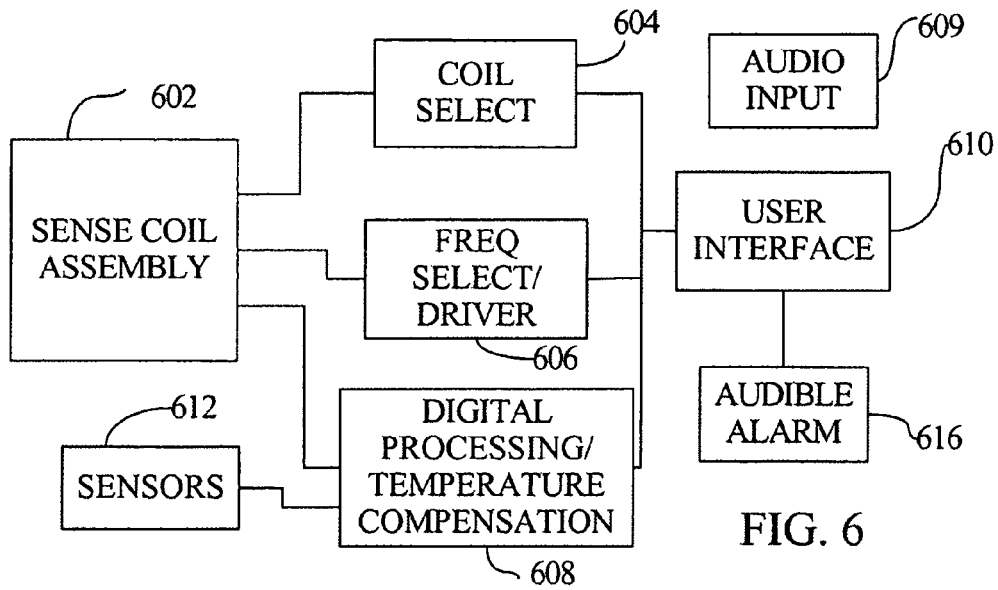
FIG. 6 is a diagram illustrating a representative metal detector system.

A representative metal detector is illustrated in FIG. 6. A sense coil assembly 602 comprising two or more sense coils (such as sense coils of different sizes or an array of sense coils) is coupled to a coil selector 604 and a frequency selectable coil driver 606. Electrical signals from the selected coil or coils of the sense coil assembly are coupled to a digital processing/temperature compensation system 608. One or more sensors 612 can be provided for estimation of temperature changes, sense coil motion, or other parameters. Selection of particular frequencies and sense coils can be performed without user input, or a user interface 610 can be configured to permit user control. In one example, the metal detector is configured to detect electrical signals associated with other devices such as, for example, other metal detectors, and to select an alternative frequency of operation to avoid interference. Sensed temperatures can be used for temperature compensation, and/or DSP based filter or processing can be used. If a signal associated with a conductive object is detected, an audible alarm unit 616 can be activated. The alarm unit can provide audio alarms of varying loudness, frequency, or repetition rate based on a detected signal magnitude. Voice announcements (either pre-stored or synthesized) can also be used. The alarm 616 can also be configured to provide operational information to the user, and a sound based input device 609 can be provided so that a user can operate the metal detector without requiring hand adjustment of settings or examination of a display screen. In this way, a security officer can conduct screenings without distraction.

Figure 7:
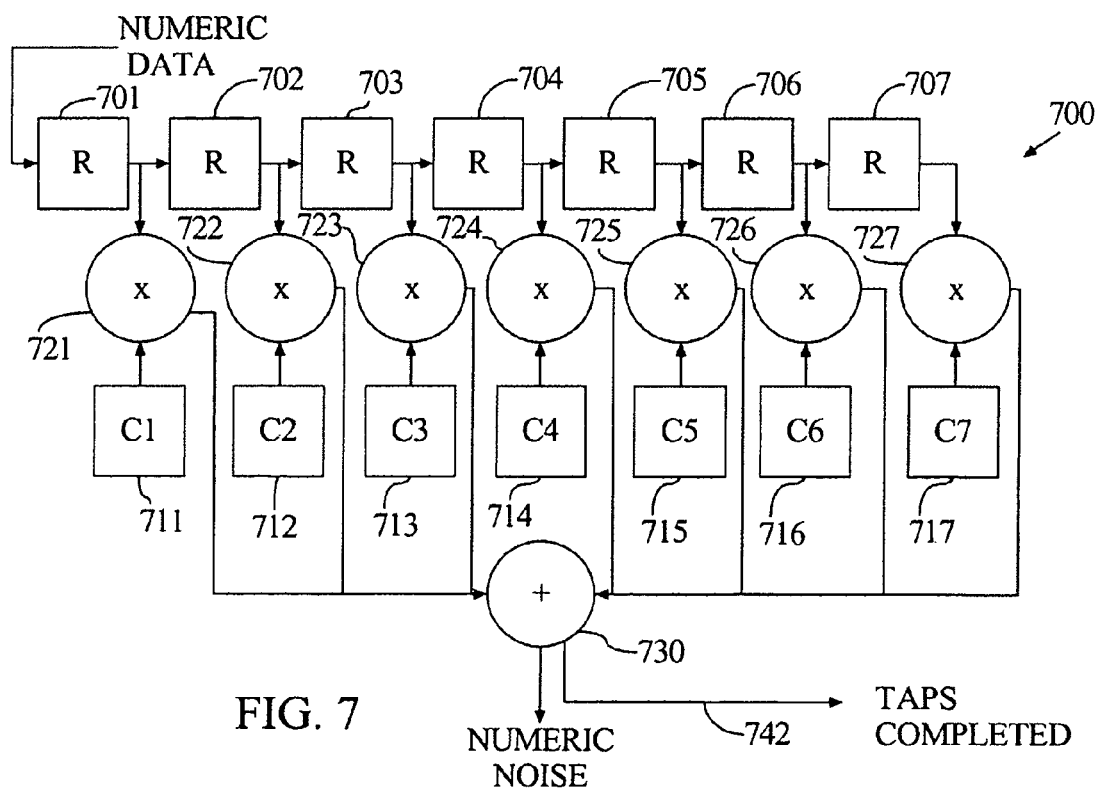
FIG. 7 is a diagram illustrating a representative digital filter.

FIG. 7 illustrates a representative digital filter 700 that can be configured to, for example, low pass filter the combined numeric data to produce a noise-enhanced numeric representation. The filter 700 includes registers 701-707 that are coupled to sequentially provide numeric values of the input numeric data to respective multipliers 721-727. The multipliers 721-727 are coupled to receive respective filter coefficients $C1$-$C7$ that are stored in one or more memories or memory locations and to produce products of the filter coefficients and the sequenced data. An adder 730 produces a sum of the products. Typically, the digital filter 700 is implemented based on a series of computer-executable instructions that are provided to a computer, a microprocessor, a dedicated signal processor, a personal digital assistant, or other digital device. However, hardware implementations can also be used. In examples, the coefficients are fixed, but these coefficients can be recomputed to provide adaptive filtering.

In many metal detector applications, it is desirable to process sense signals immediately upon detector startup. As is apparent from FIG. 7, the filter 700 provides some delay in producing the numeric noise output as a series of data values must be sequenced through the registers 701-711. As shown in FIG. 7, an output 742 is provided to indicate that valid outputs from all the registers have been provided to the adder 730. Alternatively, the output 742 can indicate a number of finite impulse response filter taps that have been used with valid data so that a user can anticipate when the filter will produce a final filtered output. Based on the output 742, the metal detector can provide an indicator so that a user can determine if fully processed data is available while still obtaining useful data during initial processing. In some examples, the coefficients $C1$-$C7$ can be selected to be generally or monotonically decreasing in magnitude so that intermediate sums produced by the adder 730 tend to substantially approximate the sum produced with all filter coefficients.

In some examples, relative motion between a sense coil (or a sense volume) with respect to a conductive object can be used to distinguish an electrical signal portion associated with the conductive object from electrical signal portions associated with background noise, thermal effects, or other extraneous signal portions. However, such extraneous portions can be identified and reduced without use of relative motion. For example, background noise can be independently characterized and/or measured. In such examples, conductive objects can be detected without use of or reliance on relative motion. In other examples, a pair of sense coils can be provided so that a first sense coil is configured to detect conductive objects, while a second sense coil is configured to detect noise, thermal effects, or other signals. In such a configuration, signals from the first and second sense coils can be subtracted or otherwise processed to improve conductive object detection.

Figure 8:
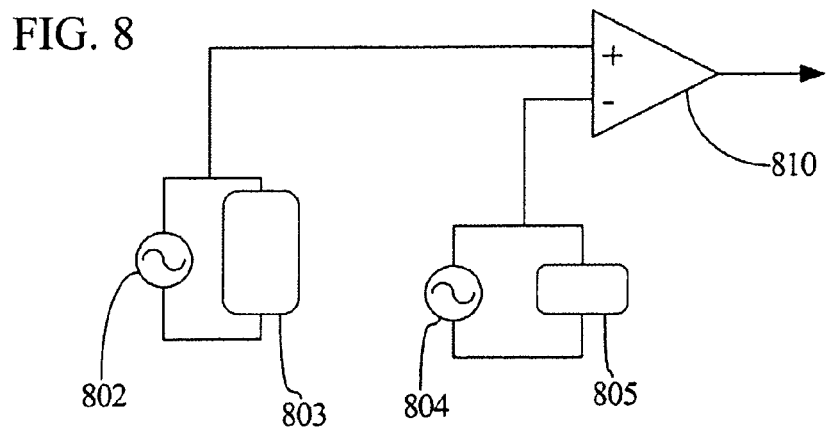
FIG. 8 is a schematic diagram illustrating a system that includes two sense coils configured to produce a difference signal.

Referring to FIG. 8, a detector configuration that includes two sense coils is illustrated. A first sense coil 803 is energized by a driver 802 and a second sense coil 805 is energized by a driver 804. Signals associated with the sense coil/driver combinations are coupled to a differential amplifier 810 that produces an output signal based on a difference between electrical signals associated with the first sense coil 803 and the second sense coil 805. The first and second sense coils are configured to provide similar signal contributions associated with background noise, thermal effects, and fixed pattern noise while providing different signal contributions associated with detection of a conductive object. In some examples, the first and second sense coils have different cross-sectional areas or are arranged so as to be orthogonal. In such configurations, magnitudes of signals associated with a conductive object are different, and a signal difference can be arranged to substantially reduced noise while still providing a satisfactory indication of conductive object presence. Two drivers are illustrated in FIG. 8, but in other examples a single driver can be configured to selectively (for example, alternatingly) excite the first and second sense coils. The signal difference illustrated in FIG. 8 can be produced based on analog signals, or the difference can be a numeric difference based on numeric representations of the signals associated with the first sense coil and the second sense coil.

In view of the many possible embodiments to which the principles of the disclosed technology may be applied, it should be recognized that the illustrated embodiments are only examples and should not be taken as limiting the scope of the disclosure. For example, a signal processor can include one or more separate components, and the disclosed systems can be configured to be compact for handheld and/or battery operation, or larger detection systems can be provided. Digital filters can be implemented as infinite impulse response filters, finite impulse response filters, or otherwise implemented. Matched filters, correlators, bandpass, high pass, low pass, and other filter types and configurations can be used. Sensed signals can be based on sense coils as illustrated, or other effects such as, for example, the magneto-resistive effect. In view of these and other variations, we therefore claim as our invention all that comes within the scope and spirit of the following claims.

We claim:

1. An apparatus, comprising:
   a sense coil defining a sensing volume;
   an analog to digital converter coupled to the sense coil, and configured to receive a sense signal that includes a contribution associated with a conductive object situated in the sensing volume and to produce a numeric representation of the sense signal; and
   a signal processor configured to receive the numeric representation of the sense signal and produce a numeric representation of a noise contribution to the sense signal.

2. The apparatus of claim 1, wherein the signal processor is configured to produce a processed numeric signal based on a difference between the numeric representation of the sense signal and the numeric representation of the noise contribution.

3. The apparatus of claim 2, wherein the signal processor is configured to produce the numeric representation of the noise contribution based on a digital low pass filter.

4. The apparatus of claim 2, further comprising an alarm configured to indicate the presence of a conductive object in the sense volume based on the processed numeric signal.

5. The apparatus of claim 4, where the indication is based on a magnitude of the object contribution to the numeric representation of the sense signal.

6. The apparatus of claim 5, further comprising an audio interface coupled to the signal processor and configured to receive a voice input establishing a detection threshold.

7. The apparatus of claim 1, wherein the signal processor is configured to produce the numeric representation of the noise contribution based on a digital low pass filter.

8. The apparatus of claim 7, wherein the signal processor comprises a memory configured to store at least one filter coefficient and to process the difference based the at least one stored filter coefficient.

9. The apparatus of claim 7, wherein the signal processor is configured to store a numeric signal model and to produce a cross-correlation of the numeric signal model and the difference.

10. The apparatus of claim 9 further comprising a motion sensor coupled to the signal processor and configured to produce an indication of a sense coil speed, and the signal processor is configured to produce the numeric signal model based on the indication of the sense coil speed.

11. The apparatus of claim 10, further comprising a memory coupled to the signal processor and configured to store a representation of thermal noise magnitude as a function of temperature, wherein the signal processor is configured to determine a thermal contribution based on the representation.

12. The apparatus of claim 7, wherein the signal processor is configured to store a numeric signal model and to produce a cross-correlation of the numeric signal model and the numeric representation of the sense signal.

13. A detection method for detection of a conductive object, comprising:
   obtaining a detection signal associated with a presence of the conductive object in a sense volume;
   digitizing the detection signal to produce a numeric representation of the detection signal;
   processing the numeric representation of the detection signal to produce an estimated noise contribution to the numeric representation; and
   estimating a conductive object contribution to the numeric representation based on a difference between the numeric representation of the detection signal and the estimated noise contribution.

14. The method of claim 13, further comprising processing the estimated conductive object contribution based on a temporal response associated with relative speed of the sense coil and the conductive object in the sense volume.

15. The method of claim 14, further comprising obtaining an indication of the relative speed of the conductive object, and processing the estimated conductive object contribution based on the indicated relative speed.

16. The method of claim 13, further comprising applying a matched filter to the estimated conductive object contribution.

17. The method of claim 16, wherein the matched filter is based on estimated relative speed of the sense volume and the object.

18. The method of claim 13, further comprising comparing an estimated conductive object contribution to an alarm threshold, and producing an alarm based on the comparison.

19. The method of claim 18, wherein an alarm magnitude is based on the comparison.

20. The method of claim 18, wherein the alarm is at least one of an audible or visible alarm.

21. The method of claim 13 further comprising:
   storing a numeric signal model; and
   producing a cross-correlation of the numeric signal model and the difference to estimate the conductive object contribution.

22. The method of claim 13 further comprising:
   determining a numeric signal model based on an indication of sense coil speed; and
   producing a cross-correlation of the numeric signal model and the numeric representation of the sense signal to estimate the conductive object contribution.

23. A conductive object detection system, comprising:
   a first sense coil and a second sense coil;
   a sense coil selector configured to select one or more of the first sense coil and the second sense coil so as to produce a sense signal; and
   an analog to digital converter configured to produce a numeric representation of the sense signal;
   a signal processor configured to produce an indication associated with a presence of a conductive object based on a difference of the numeric representation of the sense signal and a low pass filtered numeric representation of the sense signal.

24. The detection system of claim 23, wherein the first sense coil has a substantially larger sense volume than the second sense coil.

25. The detection system of claim 23 wherein the sense coil selector is configured to select the first and second sense coils so as to produce the sense signal based on the combination.

* * * * *